United States Patent
Goldsteen et al.

(10) Patent No.: US 12,554,838 B2
(45) Date of Patent: Feb. 17, 2026

(54) ASSESSING FEATURE-BASED PRIVACY RISK IN MACHINE LEARNING MODEL

(71) Applicant: International Business Machines Corporation, Armonk, NY (US)

(72) Inventors: Abigail Goldsteen, Haifa (IL); Ariel Farkash, Shimshit (IL); Shlomit Shachor Ifergan, Haifa (IL); Natalia Razinkov, Haifa (IL); Maya Anderson, Netanya (IL); Ron Shmelkin, Givatayim (IL)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 18/192,710

(22) Filed: Mar. 30, 2023

(65) Prior Publication Data

US 2024/0330439 A1 Oct. 3, 2024

(51) Int. Cl.
*G06F 21/55* (2013.01)
*G06F 21/57* (2013.01)
*G06F 21/62* (2013.01)

(52) U.S. Cl.
CPC .......... *G06F 21/552* (2013.01); *G06F 21/577* (2013.01); *G06F 21/6254* (2013.01); *G06F 2221/034* (2013.01)

(58) Field of Classification Search
CPC .. G06F 21/552; G06F 21/577; G06F 21/6256; G06F 21/57; G06F 21/50; G06F 2221/034; G06F 21/62; G06F 21/602; G06F 21/6254; G06N 5/00; H04L 9/008
See application file for complete search history.

(56) References Cited

U.S. PATENT DOCUMENTS

| 7,318,051 | B2 | 1/2008 | Weston |
| 8,301,638 | B2 | 10/2012 | Xu |
| 8,346,749 | B2 | 1/2013 | Krause |
| 11,288,379 | B2 * | 3/2022 | Mireshghallah ......... G06N 3/08 |

(Continued)

FOREIGN PATENT DOCUMENTS

| CN | 100354864 C | 12/2007 |
| CN | 113988312 A | 1/2022 |
| WO | WO-2021075057 A1 * | 4/2021 |

OTHER PUBLICATIONS

Hui, B., Yang, Y., Yuan, H., Burlina, P., Gong, N. Z., & Cao, Y. (2021). Practical blind membership inference attack via differential comparisons. arXiv preprint arXiv:2101.01341 (Year: 2021).*

(Continued)

*Primary Examiner* — Tae K Kim
(74) *Attorney, Agent, or Firm* — Anthony M. Pallone (57) ABSTRACT

According to one embodiment, a method, computer system, and computer program product for assessing privacy risk is provided. The embodiment may include identifying a data set and a machine learning model. The embodiment may also include selecting a target feature set comprising one or more target features of the data set. The embodiment may further include conducting one or more differential inference attacks on the machine learning model based on the target feature set. The embodiment may also include determining a privacy risk score for the target feature set based on results of the one or more differential inference attacks.

17 Claims, 2 Drawing Sheets

(56) References Cited

U.S. PATENT DOCUMENTS

| | | | | |
|---|---|---|---|---|
| 2015/0295948 | A1* | 10/2015 | Hassell | H04L 63/1441 726/25 |
| 2016/0026917 | A1 | 1/2016 | Weisberg | |
| 2018/0018463 | A1* | 1/2018 | Grossman | A63F 13/75 |
| 2020/0082097 | A1* | 3/2020 | Poliakov | G06F 21/577 |
| 2020/0311300 | A1* | 10/2020 | Callcut | G06F 16/256 |
| 2020/0394320 | A1 | 12/2020 | Bernau | |
| 2021/0064760 | A1* | 3/2021 | Sharma | G06F 21/577 |
| 2021/0303695 | A1* | 9/2021 | Grosse | G06F 17/18 |
| 2021/0342546 | A1* | 11/2021 | Beigi | G06N 3/044 |
| 2021/0357517 | A1 | 11/2021 | Ramanathan | |
| 2021/0409197 | A1* | 12/2021 | Baracaldo Angel | G06F 18/2148 |
| 2022/0224702 | A1* | 7/2022 | Dherange | H04L 63/1433 |
| 2022/0300618 | A1* | 9/2022 | Ding | G06N 5/01 |
| 2023/0019779 | A1* | 1/2023 | Santana De Oliveira | G06F 21/6245 |
| 2023/0274004 | A1* | 8/2023 | Kanani | G06F 21/6245 726/26 |
| 2024/0095385 | A1* | 3/2024 | Dhouib | G06F 21/6254 |
| 2024/0220663 | A1* | 7/2024 | Ezrielev | G06F 21/64 |
| 2024/0320541 | A1* | 9/2024 | Goldsteen | G06N 20/00 |

OTHER PUBLICATIONS

Yao, Y. (2022). Exploration of Membership Inference Attack on Convolutional Neural Networks and Its Defenses. IEEE. 2022 International Conference on Image Processing, Computer Vision, and Machine Learning (ICICML). Oct. 28-30, 2022. (Year: 2022).*

Liu, Y., Wen, R., He, X., Salem, A., Zhang, Z., Backes, M., . . . & Zhang, Y. (2022). {ML-Doctor}: Holistic risk assessment of inference attacks against machine learning models. In 31st USENIX Security Symposium (USENIX Security 22) (pp. 4525-4542). (Year: 2022).*

Ge, J. (2022). White-box Inference Attacks against Centralized Machine Learning and Federated Learning. arXiv preprint arXiv:2301. 03595. (Year: 2022).*

Ye, D., Shen, S., Zhu, T., Liu, B., Zhou, W. One Parameter Defense—Defending Against Data Inference Attacks via Differential Privacy. Mar. 30, 2022. IEEE. IEEE Transactions on Information Forensics and Security, vol. 17, pp. 1466-1480. 2022. (Year: 2022).*

Melis, L., Song, C., De Cristofaro, E., & Shmatikov, V. (May 2019). Exploiting unintended feature leakage in collaborative learning. In 2019 IEEE symposium on security and privacy (SP) (pp. 691-706). IEEE. (Year: 2019).*

Song, L., & Mittal, P. (2021). Systematic evaluation of privacy risks of machine learning models. In 30th USENIX Security Symposium (USENIX Security 21) (pp. 2615-2632). (Year: 2021).*

Choudhury, O., Gkoulalas-Divanis, A., Salonidis, T., Sylla, I., Park, Y., Hsu, G., & Das, A. (2020). Anonymizing data for privacy-preserving federated learning. arXiv preprint arXiv:2002.09096. (Year: 2020).*

Jia, J., Salem, A., Backes, M., Zhang, Y., & Gong, N. Z. (Nov. 2019). Memguard: Defending against black-box membership inference attacks via adversarial examples. In Proceedings of the 2019 ACM SIGSAC conference on computer and communications security (pp. 259-274). (Year: 2019).*

Long, Y., Bindschaedler, V., & Gunter, C. A. (2017). Towards measuring membership privacy. arXiv preprint arXiv:1712.09136. (Year: 2017).*

Carlini et al., "The Privacy Onion Effect: Memorization is Relative", arXiv:2206.10469v2 [cs.LG], Jun. 22. 2022, 14 Pages.

Goldsteen et al., "Reducing Risk of Model Inversion Using Privacy-Guided Training", arXiv:2006.15877v1 [cs.LG], Jun. 29, 2020, 12 Pages.

* cited by examiner

ASSESSING FEATURE-BASED PRIVACY RISK IN MACHINE LEARNING MODEL

BACKGROUND

The present invention relates generally to the field of computing, and more particularly to artificial intelligence.

Artificial intelligence is a field of computing that enables computers to simulate the types of intelligence that are typically associated with humans, allowing computers to perform such tasks as natural language processing, image recognition, pattern recognition, speech-to-text, and sentiment analysis. Artificial intelligence may use such techniques as machine learning, artificial neural networks, computer vision, and generative adversarial networks in order to solve such problems with improved accuracy, efficiency, reliability, or transparency.

Machine learning, particularly, may be a useful way to process preexisting training data in order to project conclusions about unknown information. A model is typically not intended to make specific training data visible, but rather to learn available general insights about the data. However, several advanced attacks may be used in an attempt to leak information about the data used to train a machine learning model. Maintaining the privacy or security of training data in the face of such attacks may be crucial to the operation of the artificial intelligence system. Some solutions may test for privacy issues by assessing a machine learning model as a whole, or superficially targeting specific features. However, these solutions may not provide deep insights into the actual security threat posed by potential attackers, or may fail to take other factors into account effectively.

SUMMARY

According to one embodiment, a method, computer system, and computer program product for assessing privacy risk is provided. The embodiment may include identifying a data set and a machine learning model. The embodiment may also include selecting a target feature set comprising one or more target features of the data set. The embodiment may further include conducting one or more differential inference attacks on the machine learning model based on the target feature set. The embodiment may also include determining a privacy risk score for the target feature set based on results of the one or more differential inference attacks.

In a preferred embodiment, the embodiment further selects a mitigation strategy for mitigating a privacy risk corresponding to the target feature set based on a determination that the privacy risk score of the target feature set exceeds a predetermined threshold.

In a preferred embodiment, the embodiment further conducts one or more additional feature tests and determines an overall privacy risk score for the feature set based on results of the one or more differential inference attacks and the one or more additional feature tests.

In a preferred embodiment, the one or more additional feature tests include one or more feature-level inference attacks.

In a preferred embodiment, the overall privacy risk score is a modified privacy risk score that is further based on a risk that the target feature set will contribute to overfitting.

In a preferred embodiment, the embodiment further repeats the selecting, the conducting, and the determining at least one time.

In a preferred embodiment, the risk mitigation strategy includes anonymizing the target feature set.

In a preferred embodiment, the risk mitigation strategy includes removing the target feature set from the data set or creating a new data set without the target feature set.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to natural language processing. The following described exemplary embodiments provide a system, method, and program product to, among other things, analyze the privacy risk of a machine learning model. Therefore, the present embodiment has the capacity to improve the technical field of artificial intelligence by testing a machine learning model through use of differential inference attacks.

As previously described, artificial intelligence is a field of computing that enables computers to simulate the types of intelligence that are typically associated with humans, allowing computers to perform such tasks as natural language processing, image recognition, pattern recognition, speech-to-text, and sentiment analysis. Artificial intelligence may use such techniques as machine learning, artificial neural networks, computer vision, and generative adversarial networks in order to solve such problems with improved accuracy, efficiency, reliability, or transparency.

Machine learning, particularly, may be a useful way to process preexisting training data in order to project conclusions about unknown information. A model is typically not intended to make specific training data visible, but rather to learn available general insights about the data. However, several advanced attacks may be used in an attempt to leak information about the data used to train a machine learning model. As such, it may be advantageous to, among other things, test the security and privacy of a machine learning model by using one or more differential inference attacks to determine privacy risk as it relates to various features.

According to one embodiment, a privacy risk analysis program analyzes privacy risk. The privacy risk analysis program may identify a trained model and a data set to use for testing. The privacy risk analysis program may select one or more features to test using one or more differential inference attacks. Based on the results of these attacks, the privacy risk analysis program may assign a privacy risk score to the features. The privacy risk analysis program may then select a mitigation strategy for one or more features described as high risk.

One or more embodiments described above may convey the advantage of enhancing the privacy of a machine learning model by providing optimized privacy mitigation. The embodiments may provide such privacy enhancements while maintaining or even improving performance and accuracy by reducing overfitting or by applying privacy mitigations in a targeted manner to reduce the harmful effect of these mitigations.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
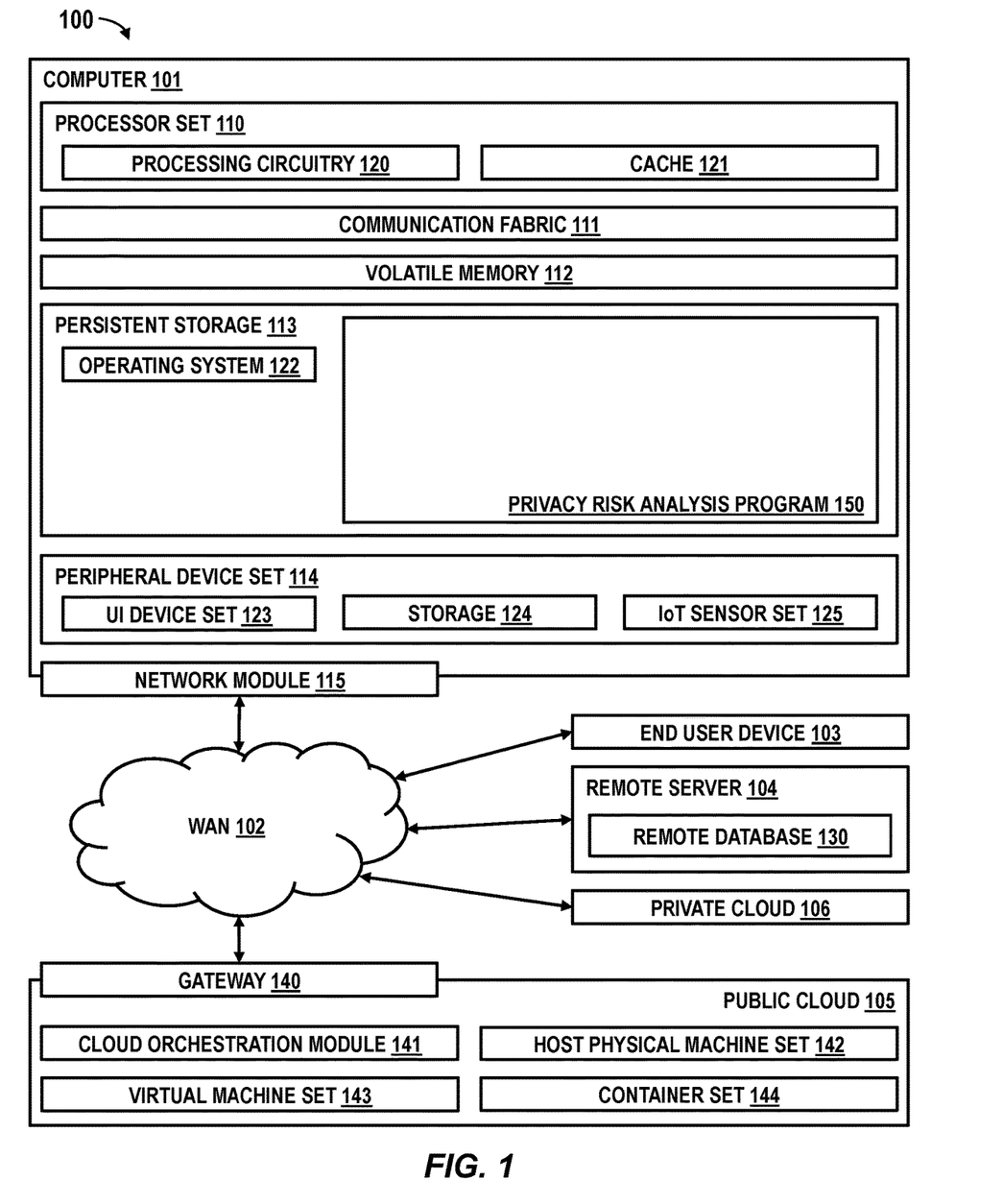
FIG. 1 illustrates an exemplary networked computer environment according to at least one embodiment.

Referring now to FIG. 1, computing environment 100 contains an example of an environment for the execution of at least some of the computer code involved in performing the inventive methods, such as privacy risk analysis program 150. In addition to privacy risk analysis program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and privacy risk analysis program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in privacy risk analysis program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in privacy risk analysis program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The privacy risk analysis program 150 may identify a trained model and a data set. The privacy risk analysis program 150 may then select one or more target features to test using one or more differential inference attacks. Based on the results of these attacks, the privacy risk analysis program 150 may assign a privacy risk score to the one or more features. The privacy risk analysis program 150 may then identify features associated with a high privacy risk and select one or more mitigation strategies to mitigate that risk.

Furthermore, notwithstanding depiction in computer 101, privacy risk analysis program 150 may be stored in and/or executed by, individually or in any combination, end user device 103, remote server 104, public cloud 105, and private cloud 106. The discourse explanation method is explained in more detail below with respect to FIG. 2.

Figure 2:
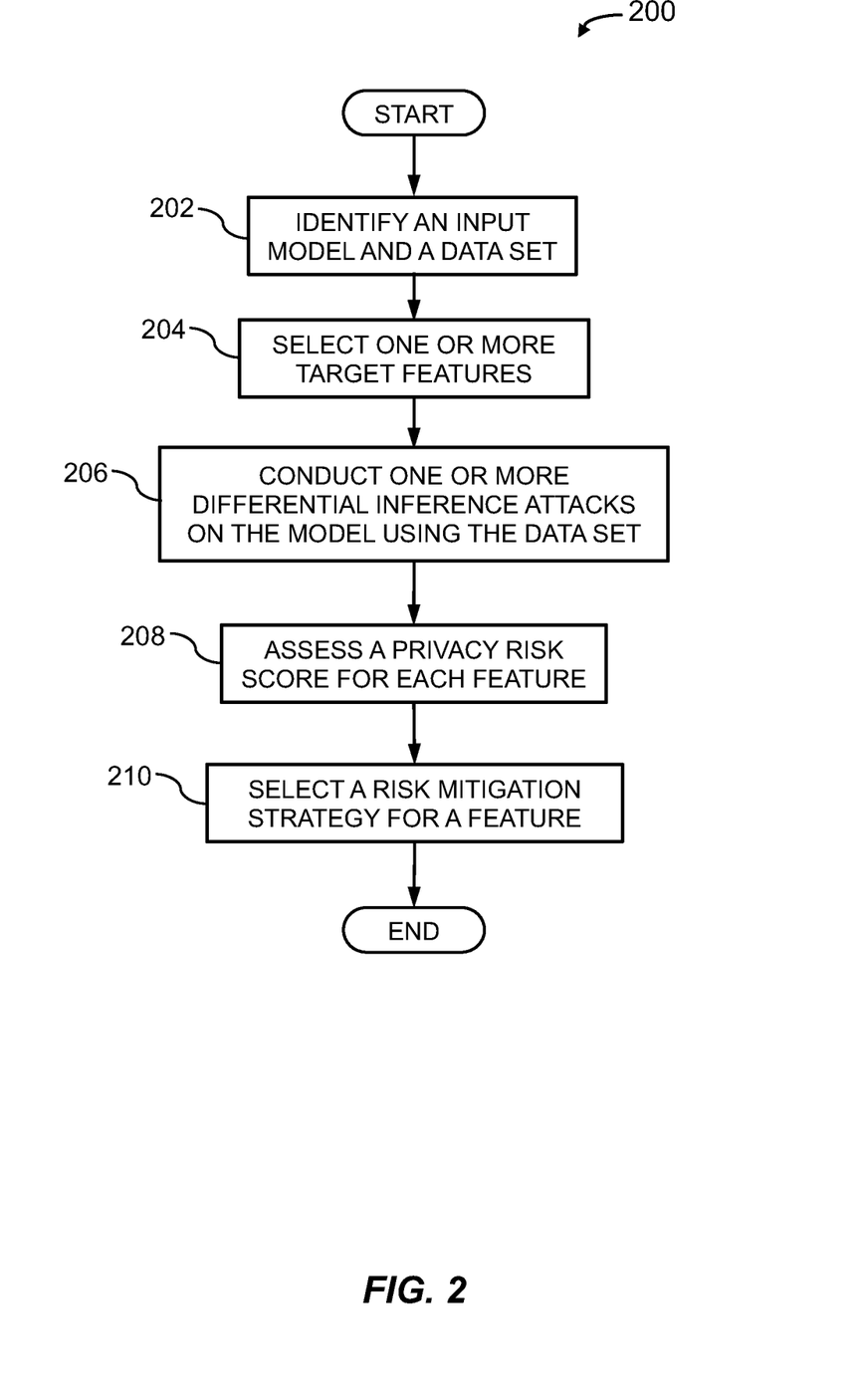
FIG. 2 illustrates an operational flowchart for a process for analyzing the privacy risk of a machine learning model.

Referring now to FIG. 2, an operational flowchart for a process for privacy risk analysis of a machine learning model 200 is depicted according to at least one embodiment. At 202, the privacy risk analysis program 150 identifies a machine learning model and one or more data sets. The model may be a pre-trained model, or may be trained by the privacy risk analysis program 150. The data set may be used to test or train the model.

Identifying a machine learning model may include, for example, receiving a pre-trained model as input, training a model with a data set, or creating a machine learning model and training it. A model may be trained with one of the one or more data sets, with newly generated test data sets, or with a portion or combination thereof. For example, a model may be trained on 80% of a data set, and the remaining 20% of the data set may be used to test the model. A machine learning model may be trained and retrained, and the privacy risk analysis program 150 may identify any number of trained or untrained machine learning models, and train and retrain any number of models any number of times.

Identifying a data set may include, for example receiving a data set as input, generating a data set, or modifying an existing data set. An existing data set may be modified, for instance, by being combined with another set, by removing a portion of the data set, by combining portions, by removing features, by modifying features, by adding features found in another set, or by the process for privacy risk analysis of a machine learning model 200. For example, a mitigation strategy at 210 may include modifying a feature by using homomorphic encryption to encrypt the feature.

A data set may include data structured into one or more features, attributes, categories, or fields, or may be processed or structured into such a form. Alternatively, data may come in an unstructured format. Data may include, for example, text, numerical data, images, video, audio, anonymized data, homomorphically encrypted data, or any data in any format that may be used to train a machine learning algorithm.

Then, at 204, the privacy risk analysis program 150 selects one or more target features. Selecting target features may include selecting one target feature, selecting a set of multiple features to test at once, or selecting multiple sets of one or more target features for multiple tests. Target features may be selected manually or by an algorithmic process. Target features may all be selected at once, or may be selected as part of an iterative or similar process for exploring various combinations of risk scores.

Selecting target features may include selecting one target feature, selecting a set of multiple features to test at once, or selecting multiple sets of one or more target features for multiple tests. For example, if a data set, obtained through opt-in procedures, represents users with a set of features:

{age, marital status, city, country, occupation, income} then selecting a single target feature may mean deciding to target the "age" feature to test at 206, or a set including only the "age" feature; selecting multiple features to test at once may mean targeting the set:

{age, occupation, income}
to test as a combination at 206; and selecting multiple sets of one or more target features may include testing each set in the following list or set of sets:

```
{ {age},
  { age, marital status },
  { age, marital status, income }
  { age, city, occupation },
  { age, city, income },
  { marital status, city },
  { marital status, income },
  { occupation, income },
  { income } }
```

In at least one embodiment, target features may be selected manually. For example, a human user may select five sets of target features that contain private or sensitive data, are suspected to be of minimal usefulness in training the model, or are suspected to be redundant or irrelevant in case removing those features helps to account for overfitting.

In another embodiment, target features may be selected by an algorithmic process. An algorithmic process may include a simple algorithm, such as selecting features based on simple statistical aspects such as uniqueness, variance, or the size of the domain. Alternatively, an algorithmic process may include a more complex algorithm, including artificial intelligence, to determine an estimated privacy risk by a different process, suspected overfitting effect, or similar. A complex algorithm may include or use the privacy risk analysis program 150. For example, a complex algorithm may include using the privacy risk analysis program to remove one feature from a data set, and then select a feature from the remaining feature set based on a previously determined risk score, recursively selecting features until a target level of risk is reached. As another alternative, an algorithmic method may include selecting target features iteratively, randomly, exhaustively, or in any other manner that may suit fast, efficient, accurate, or secure execution of the privacy risk analysis program 150.

Target features may all be selected at once, or may be selected as part of an iterative or similar process for exploring various combinations of risk scores. Selecting all target features at once may include selecting a number (e.g., five) sets of features to test (e.g., name; age; name and age; name and height; name, age, and height) or an exhaustive selection of every possible set of features to test (that is, the power set of features, minus the empty set of no features).

Next, at 206, the privacy risk analysis program 150 conducts one or more differential inference attacks on the model with regards to the target features. A differential inference attack may include any whole-model-type attack run once against the model trained on the full set of training data, and then again on the model trained on the set of training data with the selected target features removed. Whole model attacks may include, for example, membership inference, model inversion, database reconstruction, or property inversion attacks. The privacy risk analysis program 150 may also test a feature set by running one or more feature-level inference attacks, such as attribute inference or property inference attacks, and may additionally run any other tests on the model. Inference attacks may be used to test a level of risk relating to a model, such as a risk that the model may leak private information about the data with which it was trained. Any inference attack or test may be repeated any number of times.

In at least one embodiment, an inference attack may include a test run on a model to gauge the risk that the model can reveal private information it is not meant to reveal, for example by attempting to infer that information. Private information may include any information about the data with which a model was trained.

A differential inference attack may include a whole-model-type attack run first against the model trained on the full set of training data as a baseline, and then again on the model trained on the set of training data with the selected target features removed. Whole model attacks may include, for example, membership inference, model inversion, database reconstruction, or property inversion attacks. A differential inference attack may involve comparing the results of the modified model attack to the results of the baseline attack, as at 208, to gauge the difference in risk caused by the inclusion or exclusion of the feature.

In at least one embodiment, the privacy risk analysis program 150 may also run one or more feature-level inference attacks, such as attribute inference or property inference attacks. An attribute inference attack may use as input a trained model and a test data set with one of the features removed, and try to infer the missing feature. A property inference attack may instead try to identify a property of a feature, such as its average value in the training set. A feature-level inference attack may also be compared to a baseline. For example, a baseline may include an attack run with without a trained model to see how effectively an attacker can infer the missing feature or property based on the remaining features alone. An inference attack may, for example, be assigned a score at 208 by the difference between or ratio between the scores of the feature-level attack and the baseline attack.

In another embodiment, the privacy risk analysis program 150 may additionally run any other tests on the model. Other tests may include other feature tests such as performance and efficiency tests, accuracy tests, tests for overfitting, tests for confidence of results, or tests regarding the importance or significance of a feature. These tests may be run in parallel with one or more of the above attacks. For example, a performance test may measure the time it takes to train a model with and without the selected feature in the context of a differential inference attack. Alternatively, any inference attack may, in addition to attempting to infer private information, attempt to make the types of conclusions the model was intended to make in order to measure effectiveness or utility of the model.

In a more specific example, a model optimized and trained to predict video watching habits of users may be tested for effectiveness and privacy simultaneously. A differential inference attack may train the model with and without a target feature of a location where a user watched a show, and test these models using membership inference. The same models may also be tested to predict the viewing habits of ten users who were not included in the training data in order to determine how effective, useful, or probative the location feature is in helping the model make good recommendations or accurate predictions.

Any inference attack or test may be repeated any number of times. For example, if a particular method of inference attack is known for having inconsistent results, the privacy risk analysis program 150 may repeat the attack five times and use an average result from those five attacks.

Then, at 208, the privacy risk analysis program 150 assesses one or more risk scores for the selected features based, at least in part, on the differential inference attack. A risk score may be a calculation or abstract representation of the privacy risk in a machine learning model, such as a risk that the model may leak private information about the data with which it was trained. Assessing a risk score may include assessing risk scores for one or more inference attacks or assessing an overall risk score that combines risk information from multiple attacks or other sources. The privacy risk analysis program 150 may also assess other factors relating to a feature such as usefulness, sensitivity, or overfitting risk, and may further assess a modified risk score that accounts for these other factors.

A risk score may be a calculation or abstract representation of a privacy risk in a machine learning model, such as a risk that the model may leak private information about the data with which it was trained or any other private information, including any private information tested for at 206.

In at least one embodiment, a calculation of risk may include a difference, ratio, or more complex calculation based on the results of one or more tests above and a corresponding baseline. For example, for a differential inference attack, a calculation of risk may determine that the risk score is the percentage chance that the baseline attack with the model trained on the full data set accesses information about the training data, minus the percentage chance that the model trained on the modified data set with the target feature set removed obtains such information. Alternatively, a calculation of risk may include an average or weighted average of one or more types of risk.

Alternatively, the privacy risk analysis program 150 may assess risk scores in an abstract form, including a binary representation of whether or not a feature is high risk, a list of various risk scores obtained through various tests, a list of various scores representing different types of risk, an ordered list ranking the features by a level of risk.

The privacy risk analysis program 150 may also assess other factors relating to a feature such as importance, effect on confidence in the output of the model, usefulness, sensitivity, redundancy, availability, relevance, probativity, overfitting risk, effect on performance (in training or using the model), or propensity to have any other desirable or undesirable effect. For example, features containing data that is marked as confidential under a nondisclosure agreement may be marked as highly sensitive. Alternatively, if it is costly to obtain the data that fills out a feature, that feature may receive a moderately low availability score. Assessing other factors may include running other tests at 206, or finding these other factors from outside sources, including other programs, a human user identifying other factors, or information contained in the data set itself.

In a further embodiment, the privacy risk analysis program 150 may assess a modified risk score that accounts for other factors. For example, a modified risk score may include an availability cost as weighing in favor of treating a feature as though it is high risk, but include a rating of how probative a feature is of useful conclusions as weighing against treating a feature as high risk. Alternatively, a risk score may weigh many factors with privacy risk is one of the factors, or a list of various factors.

Privacy scores may also include assessing a current privacy score for any version of the model, including a version that has been retrained based on a modified data set at 202 or at 210, for example based on whole model attacks performed at 206.

The privacy risk analysis program 150 may return to step 204 or 206 at this or any other point. For example, the privacy risk analysis program 150 may return to step 204 or 206 iteratively to run attacks and other tests on a new target feature set iteratively until every feature in a list of target feature sets selected at 204 has been assigned a risk score or modified risk score.

Next, at 210, the privacy risk analysis program 150 selects one or more mitigation strategies for each of one or more high-risk features. A high-risk feature may include, for example, a feature with a highest risk score or highest modified risk score. A mitigation strategy may include removing a feature from a data set, anonymizing it, encrypting it, using differential privacy, using synthetic data, marking the feature as high risk, repeating the process for privacy risk analysis of a machine learning model 200, instructing a user or another software program that the feature is high risk, outputting a risk score, or applying, recommending, or engaging in any other mitigation strategy to mitigate the risk involved with that feature.

A high-risk feature may include, for example, a feature with a highest risk score or highest modified risk score. This may include the highest ranked feature according to abstract ratings or a feature that is otherwise found to be high risk according to one or more abstract measurements. Alternatively, high-risk features may include a number of highest risk features, a set of features that are risky beyond a certain risk score, or a set of features described by a more complex optimization method. For example, the privacy risk analysis program 150 may select all features whose risk scores exceed 40 points on an abstract scale of risk and whose relevance scores are below 30 points, or may select up to five highest-risk features that have redundancy scores above 50 points.

In at least one embodiment, a mitigation strategy may include removing a feature from a data set, or creating a new data set without the feature. Alternatively, a mitigation strategy may include anonymizing the feature, such as by manually or algorithmically removing private, personal, or potentially identifying information; by "fuzzing" data into approximate values; or by transforming a numerical field into a range (e.g., by transforming the ages in an age feature from a target's exact age based on birth date into an age range such as 30-49 years old).

A mitigation strategy may further include encrypting the contents of the feature, for example using homomorphic encryption so that the feature may be used in machine learning while maintaining privacy of the underlying data. Mitigation strategies may further include using differential privacy or using synthetic data to protect the privacy of the real data.

The privacy risk analysis program 150 may use a predetermined mitigation strategy, may offer a user an option to select a mitigation strategy, or may algorithmically determine a mitigation strategy. An algorithm may, for example, weigh other factors and projected future factors to decide whether to remove or homomorphically encrypt a feature. More specifically, an algorithm may balance the performance cost of homomorphic encryption, the performance benefit of removing a feature, the overfitting benefit of removing the feature, and the probative cost of removing a feature (or the probative benefit of including the homomorphically encrypted feature). The privacy risk analysis program 150 may use any combination of these methods to select any number of mitigation strategies for any number of features.

In a further embodiment, mitigation strategies may include instructing a user or another software program that the feature is high risk, or outputting a risk score or set of risk scores for a user, for another program, or into a general data format that may be consumed by people or by software in the future. A human may then, for example, modify a data collection algorithm to no longer collect the high-risk feature, manually modify the feature to anonymize information, or use another software program to homomorphically encrypt the data. Alternatively, another program may, at the instruction of the privacy risk analysis program 150, select a mitigation strategy and then apply that strategy.

In a further embodiment, the privacy risk analysis program 150 may, at 202, train a model on a data set that has been modified or newly created by use of a mitigation strategy.

Furthermore, a mitigation strategy may include iterating, repeating, or recursively iterating over different features at step 204, or engaging in a computational search through the possible feature sets to find a set of relevant scores. For example, if an irrelevant feature is removed from the data set, improving privacy and reducing the risk of overfitting, the privacy risk analysis program 150 may return to step 204 to find another feature to mitigate based on the new data set with the first feature removed. To build on this example, the privacy risk analysis program 150 may return to step 204, select new feature sets, test them at 206, score them at 208, and select and apply additional mitigation strategies until a certain threshold level of privacy risk has been reached, such as a less than three percent chance that a particular sensitive feature can be inferred using a sophisticated attack.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
identifying a data set and a machine learning (ML) model;
selecting a target feature set comprising one or more target features of the data set;
conducting one or more differential inference attacks on the ML model based on the target feature set, wherein a differential inference attack, of the one or more differential inference attacks, comprises a whole-model-type attack run once against the ML model trained on the data set as a baseline attack, and then run again against the ML model trained on the data set with the one or more target features removed as a modified attack;
determining a privacy risk score for the target feature set based on results of the one or more differential inference attacks, wherein the results comprise a difference in risk resulting from a comparison between results of the modified attack and results of the baseline attack; and
based on a determination that the privacy risk score of the target feature set exceeds a predetermined threshold, selecting a mitigation strategy for each of the one or more target features to mitigate a privacy risk corresponding to the target feature set, wherein the mitigation strategy comprises encrypting the one or more target features.

2. The method of claim 1, further comprising:
conducting one or more additional feature tests; and
determining an overall privacy risk score for the target feature set based on results of the one or more differential inference attacks and the one or more additional feature tests.

3. The method of claim 2, wherein the one or more additional feature tests include one or more feature-level inference attacks.

4. The method of claim 2, wherein the overall privacy risk score is a modified privacy risk score that is further based on a risk that the target feature set will contribute to overfitting.

5. The method of claim 1, further comprising:
repeating the selecting, the conducting, the determining at least one time, and the selecting.

6. The method of claim 1, wherein the mitigation strategy includes anonymizing the target feature set.

7. The method of claim 1, wherein the mitigation strategy includes removing the target feature set from the data set or creating a new data set without the target feature set.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
identifying a data set and a machine learning (ML) model;
selecting a target feature set comprising one or more target features of the data set;
conducting one or more differential inference attacks on the ML model based on the target feature set, wherein a differential inference attack, of the one or more differential inference attacks, comprises a whole-model-type attack run once against the ML model trained on the data set as a baseline attack, and then run again against the ML model trained on the data set with the one or more target features removed as a modified attack;
determining a privacy risk score for the target feature set based on results of the one or more differential inference attacks, wherein the results comprise a difference in risk resulting from a comparison between results of the modified attack and results of the baseline attack; and
based on a determination that the privacy risk score of the target feature set exceeds a predetermined threshold, selecting a mitigation strategy for each of the one or more target features to mitigate a privacy risk corresponding to the target feature set, wherein the mitigation strategy comprises encrypting the one or more target features.

9. The computer system of claim 8, further comprising:
conducting one or more additional feature tests; and
determining an overall privacy risk score for the target feature set based on results of the one or more differential inference attacks and the one or more additional feature tests.

10. The computer system of claim 9, wherein the one or more additional feature tests include one or more feature-level inference attacks.

11. The computer system of claim 8, further comprising:
repeating the selecting, the conducting, the determining at least one time, and the selecting.

12. The computer system of claim 8, wherein the mitigation strategy includes anonymizing the target feature set.

13. A computer program product, the computer program product comprising:
one or more computer-readable tangible storage medium and program instructions stored on at least one of the one or more tangible storage medium, the program instructions executable by a processor capable of performing a method, the method comprising:
identifying a data set and a machine learning (ML) model;
selecting a target feature set comprising one or more target features of the data set;
conducting one or more differential inference attacks on the ML model based on the target feature set, wherein a differential inference attack, of the one or more differential inference attacks, comprises a whole-model-type attack run once against the ML model trained on the data set as a baseline attack, and then run again against the ML model trained on the data set with the one or more target features removed as a modified attack;
determining a privacy risk score for the target feature set based on results of the one or more differential inference attacks, wherein the results comprise a difference in risk resulting from a comparison between results of the modified attack and results of the baseline attack; and
based on a determination that the privacy risk score of the target feature set exceeds a predetermined threshold, selecting a mitigation strategy for each of the one or more target features to mitigate a privacy risk corresponding to the target feature set, wherein the mitigation strategy comprises encrypting the one or more target features.

14. The computer program product of claim 13, further comprising:
conducting one or more additional feature tests; and
determining an overall privacy risk score for the target feature set based on results of the one or more differential inference attacks and the one or more additional feature tests.

15. The computer program product of claim 14, wherein the one or more additional feature tests include one or more feature-level inference attacks.

16. The computer program product of claim 13, further comprising:
repeating the selecting, the conducting, the determining at least one time, and the selecting.

17. The computer program product of claim 13, wherein the mitigation strategy includes anonymizing the target feature set.

* * * * *